(12) United States Patent
Graffin (10) Patent No.: US 10,906,797 B2
(45) Date of Patent: Feb. 2, 2021

(54) SUCTION FILLER SPOUT (71) Applicant: Serac group, La Ferte Bernard (FR)

(72) Inventor: André Jean-Jacques Graffin, Chicago, IL (US)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 16/783,519

(22) Filed: Feb. 6, 2020

(65) Prior Publication Data
US 2020/0255280 A1   Aug. 13, 2020

(30) Foreign Application Priority Data

Feb. 8, 2019 (FR) ...................... 19 01296

(51) Int. Cl.
*B67D 7/00* (2010.01)
*B67D 7/36* (2010.01)
*F16K 1/38* (2006.01)
*B67C 3/26* (2006.01)

(52) U.S. Cl.
CPC ............ *B67D 7/005* (2013.01); *B67C 3/2608* (2013.01); *B67D 7/36* (2013.01); *F16K 1/38* (2013.01)

(58) Field of Classification Search
CPC ........ B67D 7/005; B67D 7/3209; B67D 7/36; B67C 3/26; B67C 3/286; B67C 3/281; B67C 3/2608; B65D 47/40; B65D 23/06; F16K 1/38
USPC ....................................................... 222/504
See application file for complete search history.

(56) References Cited

U.S. PATENT DOCUMENTS

| 5,277,344 A * | 1/1994 | Jenkins ................. B05C 5/0225 222/504 |
| 5,954,086 A * | 9/1999 | Ronchi ................. B65B 39/004 137/244 |
| 2002/0046781 A1* | 4/2002 | Fehland ................ B67C 3/2608 141/86 |

(Continued)

FOREIGN PATENT DOCUMENTS

| DE | 2 246 176 A1 | 4/1974 |
| DE | 2246176 A1 | 4/1974 |

(Continued)

*Primary Examiner* — Benjamin R Shaw
(74) *Attorney, Agent, or Firm* — Muncy, Geissler, Olds & Lowe, P.C.

(57) ABSTRACT

The invention relates to a filler spout comprising a tubular body having mounted therein both a valve member extending facing an inlet orifice of a distribution chamber and also a shutter arranged downstream from the valve member and rigidly connected thereto in such a manner as to extend facing an outlet orifice of the distribution chamber. An actuator is coupled to the valve member in order to move it between an extreme opening position and an extreme closing position, the valve member possessing an intermediate closing position in order to form a suction piston when the valve member is moved from the extreme closing position to the intermediate closing position or from the intermediate closing position to the extreme closing position. The shutter includes a channel opening into the distribution chamber and facing the outlet orifice of said distribution chamber so that the channel is always unobstructed regardless of the position of the valve member.

7 Claims, 13 Drawing Sheets

(56) References Cited

U.S. PATENT DOCUMENTS

| | | | | |
|---|---|---|---|---|
| 2003/0155384 | A1* | 8/2003 | Nagahata | B67C 3/28 |
| | | | | 222/504 |
| 2006/0108383 | A1* | 5/2006 | Byerly | F16J 15/064 |
| | | | | 222/504 |
| 2015/0252905 | A1* | 9/2015 | Espedalen | F16K 1/02 |
| | | | | 251/324 |
| 2017/0283233 | A1* | 10/2017 | Clusserath | B67C 3/2608 |
| 2018/0009645 | A1* | 1/2018 | Graffin | B67C 3/2608 |

FOREIGN PATENT DOCUMENTS

| | | |
|---|---|---|
| WO | WO-2011/154220 A1 | 12/2011 |
| WO | WO 2011/154220 A1 | 12/2011 |
| WO | WO-2013/091750 A1 | 6/2013 |
| WO | WO 2013/091750 A1 | 6/2013 |
| WO | WO-2018/007412 A1 | 1/2018 |
| WO | WO 2018/007412 A1 | 1/2018 |

\* cited by examiner

Fig. 3D

SUCTION FILLER SPOUT

The present invention relates to filling containers with liquids, and more particularly it relates to a filler spout.

BACKGROUND OF THE INVENTION

Under industrial conditions, containers are filled in filler installations that comprise filler spouts and means for bringing containers under the filler spouts.

It is necessary for the installation to remain as clean as possible in order both to limit operations of cleaning the installation, since such operations require the installation to be stopped and therefore lower productivity, and also to avoid an operation of cleaning the containers themselves.

However, when a filler spout is controlled to interrupt the flow of liquid at the end of filling, there often remains a drop of liquid at the bottom end of the spout, which drop of liquid runs the risk of falling onto the container or onto the portion of the installation that is located under the spout.

In order to remedy that drawback, filler spouts are known that include a device connected to a vacuum source for the purpose of generating suction in the spout at the end of each filling operation and thus avoid forming a drop at the bottom end of the spout. The quantities of liquid sucked in by the device are directed to a main tank or an auxiliary tank.

Filler spouts of that type serve to ensure that the containers and/or the portions of the installation that lie below the spout are clean by limiting the formation of drops that might fall and dirty the outsides of said containers and/or said portions of the installation.

Nevertheless, such a suction device leads to a loss of liquid, requires a circuit that is relatively complicated, and leads to an increase in the time required for cleaning the installation.

OBJECT OF THE INVENTION

An object of the invention is thus to propose means serving to obviate the above-mentioned problems, at least in part.

SUMMARY OF THE INVENTION

To this end, the invention provides a filler spout comprising a tubular body having mounted therein both a valve member extending facing an inlet orifice of a distribution chamber and also a shutter arranged downstream from the valve member and rigidly connected thereto in such a manner as to extend facing an outlet orifice of the distribution chamber. An actuator is coupled to the valve member in order to move it between an extreme opening position and an extreme closing position, the valve member possessing an intermediate closing position in order to form a suction piston when the valve member is moved from the extreme closing position to the intermediate closing position or from the intermediate closing position to the extreme closing position. The shutter includes a channel opening into the distribution chamber and facing the outlet orifice of said distribution chamber so that the channel is always unobstructed regardless of the position of the valve member.

Thus, the valve member going from its extreme closing position to its intermediate closing position or from its intermediate closing position to its extreme closing position gives rise to suction in the distribution chamber, thereby preventing drop formation at the bottom end of the spout.

According to a particular characteristic, the valve member comprises a core having a top end from which there extends an axially projecting control rod that is slidably received in sealed manner in a cylindrical bore of the body, and a bottom end from which there extends an axially projecting distribution rod having an end forming the shutter facing the outlet orifice of the body.

In particular manner, the core has a first frustoconical outside surface with its small base connected to the control rod and a cylindrical outside surface connected to the large base of said frustoconical outside surface.

Advantageously, the core has a second frustoconical outside surface with its small base connected to the distribution rod.

In particular manner, the actuator is a servomotor or a stepper motor.

The invention also provides first and second distribution methods that make use of such a filler spout. The first distribution method comprises the following steps:
  bringing a container under the filler spout;
  controlling the actuator so that the valve member is in its extreme opening position;
  controlling the actuator so that the valve member moves from its extreme opening position to its extreme closing position;
  controlling the actuator so that the valve member moves from its extreme closing position to its intermediate closing position.

The second distribution method comprises the following steps:
  bringing a portion of the filler spout into a low position in the vicinity of the bottom of a container and between the low position and a high position outside the container;
  controlling the actuator so that the valve member is in its extreme opening position;
  controlling the actuator so that the valve member moves from its extreme opening position to its intermediate closing position;
  controlling the actuator so that the valve member moves from its intermediate closing position to its extreme closing position.

BRIEF DESCRIPTION OF THE DRAWINGS

The invention can be better understood in the light of the following description, which is purely illustrative and non-limiting, and which should be read with reference to the accompanying drawings, in which.

DETAILED DESCRIPTION OF THE INVENTION

With reference to FIGS. 1A to 1D, a filler spout 1 in a first embodiment of the invention comprises a generally tubular hollow body 2 that extends along a substantially vertical axis Z.

A first portion 2.1 of the body 2 defines a cylindrical feed chamber C1 that extends along the axis Z and that is for connecting to a source for feeding a liquid P via an inlet orifice 3 arranged in a side wall of the feed chamber C1.

A second portion 2.2 of the body 2 defines a distribution chamber C2 having an upstream portion of cylindrical shape and a downstream portion of converging frustoconical shape extending along the axis Z, the upstream and downstream portions thus lying on the same axis as the feed chamber C1. The frustoconical downstream portion of the distribution chamber C2 opens out via an outlet orifice 4 of the body 2 through which the liquid P can escape.

The feed chamber C1 and the distribution chamber C2 are connected together via a passage formed by a shoulder 5. This shoulder 5 has a groove arranged therein that receives a sealing gasket 6 as a moderately tight fit. In this example, the thickness of the gasket 6 is substantially equal to 2 millimeters (mm).

The body 2 contains a valve member, given overall reference 7, comprising a core 7.1 having a top end from which there extends an axially projecting control rod 7.2 that is slidably received in sealed manner in a cylindrical bore of the first portion 2.1 of the body, and a bottom end from which there extends an axially projecting distribution the rod 7.3 facing the outlet orifice 4 of the body 2.

Figure 1A:
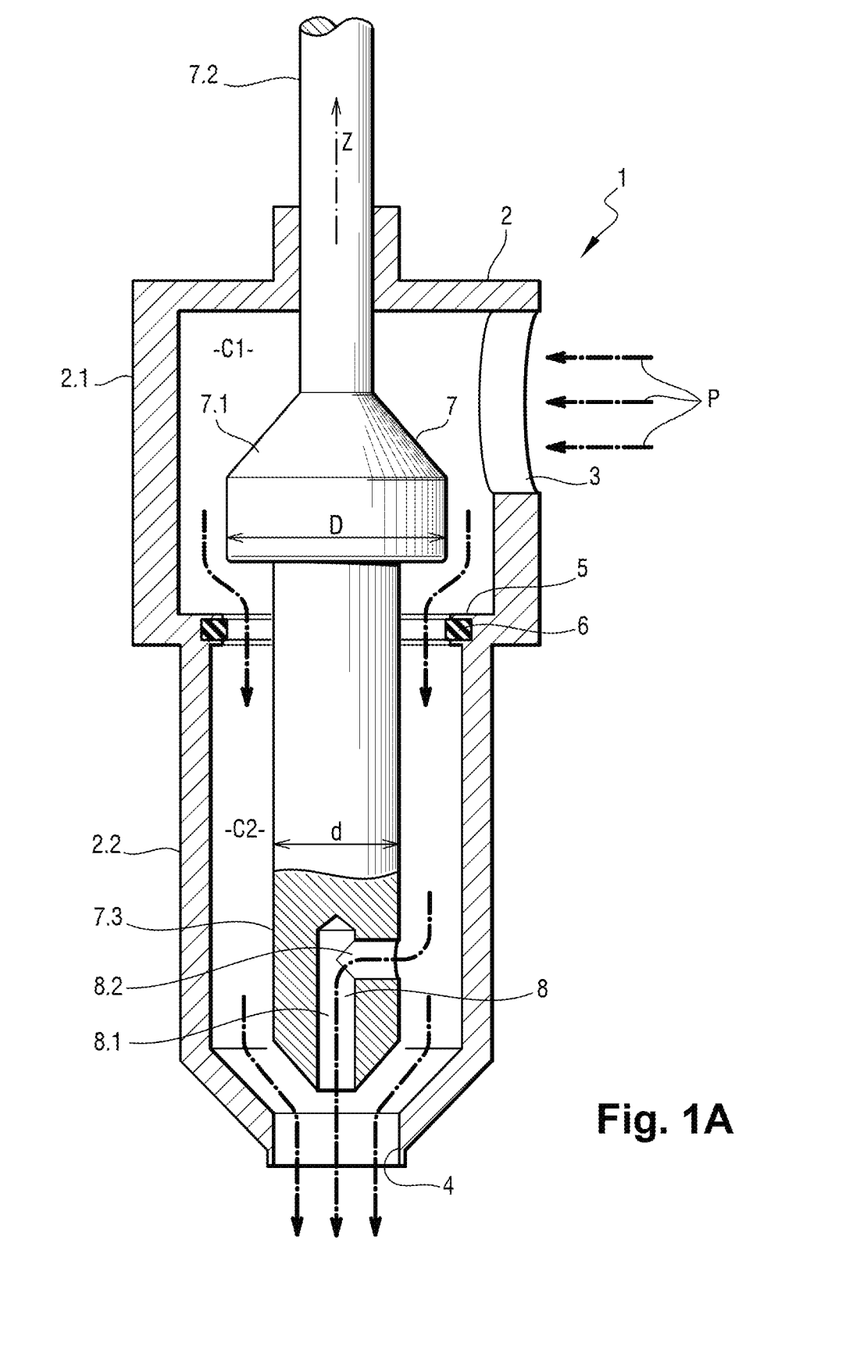
FIG. 1A is an axial section view of a filler spout in a first embodiment of the invention, the spout being in an open state with its valve member in its extreme opening position.
Figure 1B:
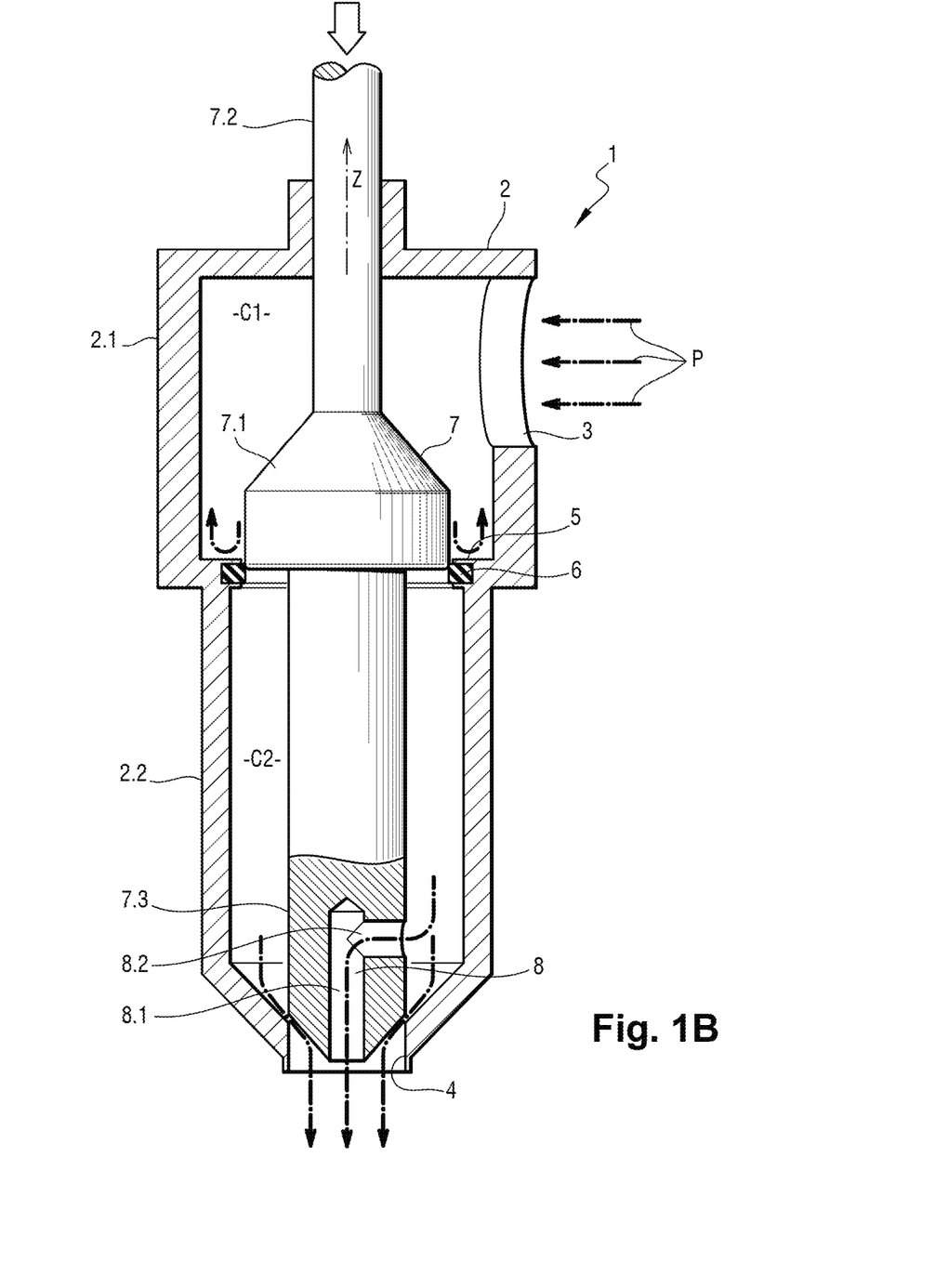
FIG. 1B is a view analogous to FIG. 1A, the spout being in a first closed state with its valve member in its intermediate closing position.
Figure 1C:
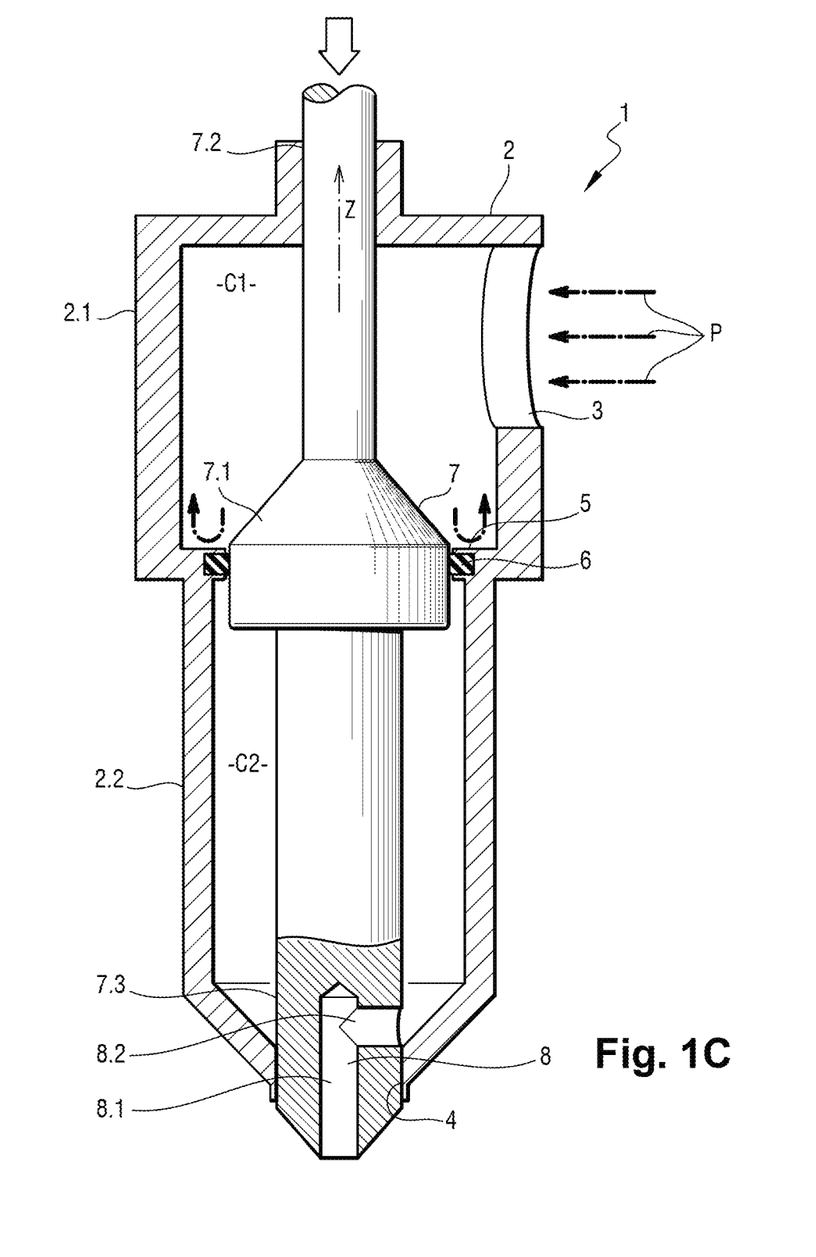
FIG. 1C is a view analogous to FIG. 1A, the spout being in a second closed state with its valve member in its extreme closing position.
Figure 1D:
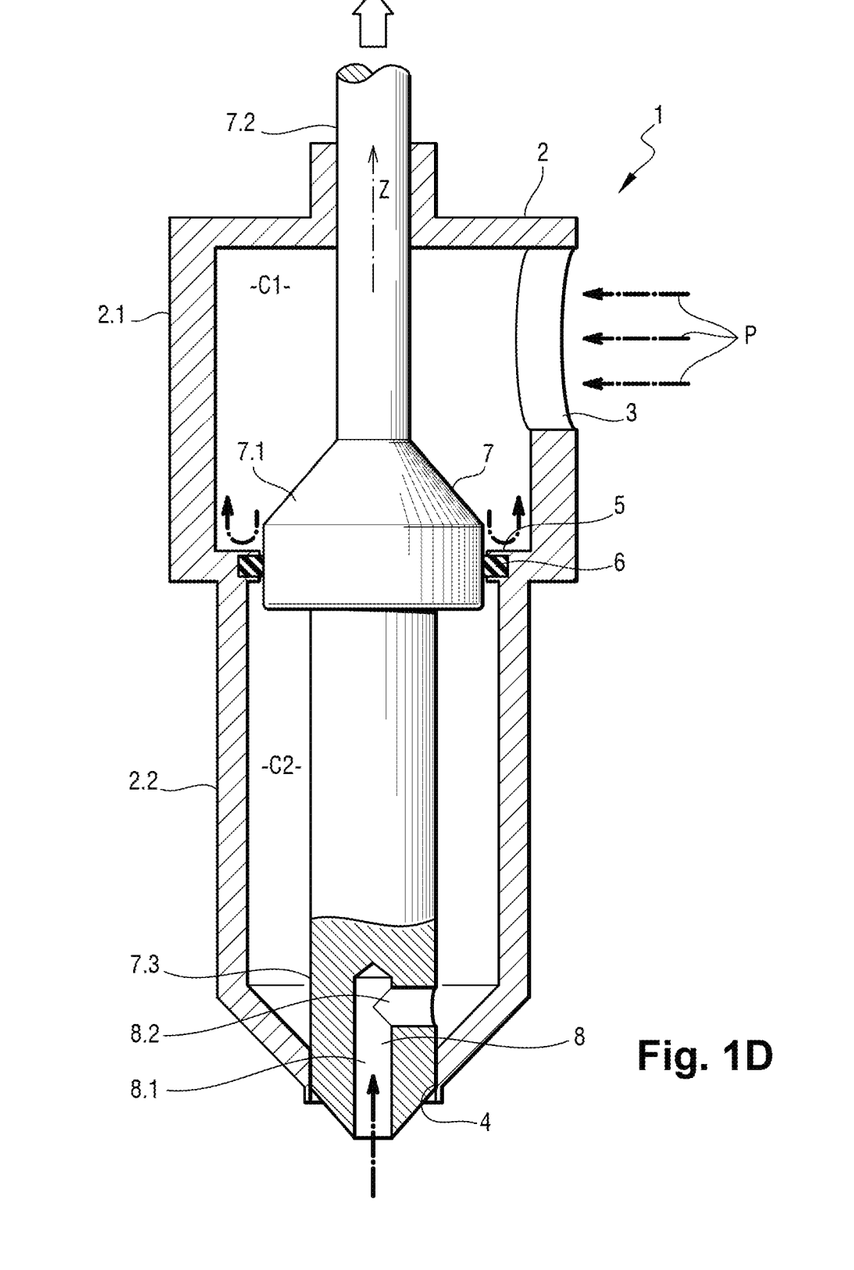
FIG. 1D is a view analogous to FIG. 1A, the spout being in a third closed state with its valve member in a position lying between its extreme closing state and its intermediate closing state.

The control rod 7.2 is coupled to an actuator (not shown herein) for moving the valve member 7 between an extreme opening position shown in FIG. 1A and an extreme closing position shown in FIG. 1D. By way of example, the actuator may be a servomotor or a stepper motor controlled by a control unit.

The diameter d of the distribution rod 7.3 is slightly smaller than the diameter of the outlet orifice 4 of the body 2 so that said distribution rod 7.3 can be slidably received in said outlet orifice 4 and obstruct it. In order to facilitate inserting the distribution rod 7.3 into the outlet orifice 4, the distribution rod 7.3 has a frustoconical outside surface on its free end.

The distribution rod 7.3 also includes a channel 8 having a first portion 8.1 that is substantially vertical opening out in the small base of the frustoconical outside surface of said distribution rod 7.3, and a second portion 8.2 that is substantially horizontal opening out in the distribution chamber C2. The first and second portions 8.1 and 8.2 of the channel 8 are substantially identical in section and they are arranged in such a manner that said channel 8 is always unobstructed in operation, regardless of the position of the valve member 7.

When the valve member 7 is in its extreme opening position or in a position relatively close thereto corresponding to a predetermined filling rate, the core 7.1 is arranged in the feed chamber C1. The top portion of the core 7.1 has a surface that is frustoconical with its small base connected to the control rod 7.2, and the bottom portion of the core 7.1 has a cylindrical surface connected to the large base of said frustoconical outside surface. The diameter D of the cylindrical outside surface of the core 7.1 is slightly greater than the inside diameter of the gasket 6 and is greater than the diameter d of the distribution rod 7.3.

There follows a detailed description of the operation of the filler spout 1.

A container that is to be filled with liquid P is arranged under the filler spout 1. The valve member 7 is then taken to its extreme opening position (FIG. 1A) in which the liquid P entering the body 2 via its inlet orifice 3 passes through the feed chamber C1 and then the distribution chamber C2 in order to form a jet of liquid P flowing substantially vertically from the outlet orifice 4 of the body 2. The rate at which the container is filled is a function of the section of the channel 8 and of the section of the passage between the frustoconical portion of the distribution chamber C2 and the frustoconical outside surface of the distribution rod 7.3.

Once a predefined filling level of the container is reached, the valve member 7 is caused to slide substantially vertically, under drive from the actuator, towards the outlet orifice 4 of the body 2.

In a first stage, the cylindrical outside surface of the core 7.1 comes into contact with a top edge of the gasket 6 (FIG. 1B). The valve member 7 is then in an intermediate closing position in which the liquid P entering through the inlet orifice 3 of the body 2 can no longer go from the feed chamber C1 to the distribution chamber C2, and the liquid P present in the distribution chamber C2 is held captive by suction in said chamber. In this example, the distance along the axis Z between the large base of the frustoconical outside surface of the distribution rod 7.1 and the small base of the frustoconical portion of the distribution chamber C2 is substantially equal to 1 mm.

As the valve member 7 continues to move down towards the outlet orifice 4, the large base of the frustoconical outside surface of the distribution rod 7.3 comes into contact with the small base of the frustoconical portion of the distribution chamber C2, thereby preventing any flow of the liquid P between the frustoconical portion of the distribution chamber C2 and the frustoconical outside surface of the distribution rod 7.3. The distribution rod 7.3 then obstructs the outlet orifice 4 of the body 2.

In this example, the valve member 7 continues to move down until the cylindrical outside surface of the core 7.1 completely covers the gasket 6 and extends beyond the bottom edge of said gasket 6 by substantially 4 mm (FIG. 1C). As a result, the core 7.1 then exerts pressure on the liquid P held captive in the distribution chamber C2 so that a portion of the liquid escapes via the channel 8, thereby having the effect of limiting splashing at the outlet orifice 4 of the body 2. The valve member 7 is then in an extreme closing position in which the liquid P entering through the inlet orifice 3 of the body 2 cannot go from the feed chamber C1 to the distribution chamber C2, and the liquid P present in the distribution chamber C2 is held captive by suction in said chamber.

Thereafter, the valve member 7 remains in the extreme closing position for a predetermined length of time. The predetermined length of time corresponds to the time needed for the liquid P situated on frustoconical outside surface of the distribution rod 7.3 to flow down a little and accumulate so as to form a drop that is suspended from the small base of said frustoconical outside surface of the distribution rod 7.3.

At the end of the predetermined length of time, and still under drive from the actuator, the valve member 7 is raised sequentially along the axis Z, through a stroke that is substantially equal to 2 mm in this example (FIG. 1D). The term "sequentially" is used herein to mean that the valve member is not raised continuously, but rather as a plurality of substantially identical sequences, the sequences being separated by periods in which the valve member 7 is stationary. In this example, each sequence corresponds to being raised through a few tenths of a millimeter.

During each raising sequence, and as a result of its diameter D being greater than the diameter d of the distribution rod 7.3, the core 7.1 creates suction in the distribution chamber C2 that serves to suck up the drop, and thus to limit pollution of the outside walls of the container.

The rising stroke of the valve member 7 depends in particular on the viscosity of the liquid P and on the area exposed to the accumulation of said liquid forming the drop.

FIGS. 2A to 2E show a filler Spout 11 in a second embodiment of the invention.

The filler spout 11 has a hollow body 12 that is substantially identical to the hollow body of the filler spout 1 and that extends along a vertical axis Z'.

Thus, a first portion 12.1 of the body 12 defines a cylindrical feed chamber C11 that extends along the axis Z' and that is for connecting to a source for feeding a liquid P' via an inlet orifice 13 arranged in a side wall of the feed chamber C11.

A second portion 12.2 of the body 12 defines a distribution chamber C12 having bottom and top portions of cylindrical shape and an intermediate portion of converging frustoconical shape extending along the axis Z', said portions thus lying on the same axis as the feed chamber C11. The cylindrical bottom portion of the distribution chamber C12 opens out via an outlet orifice 14 of the body 12 through which the liquid P' can escape.

The feed chamber C11 and the distribution chamber C12 are connected together by a passage formed by a shoulder 15. This shoulder 15 has a groove arranged therein that receives a sealing gasket 16 as a moderately tight fit. In this example, the thickness of the gasket 16 is substantially equal to 2 mm.

The body 12 contains a valve member, given overall reference 17, comprising a core 17.1 having a top end from which there extends an axially projecting control rod 17.2 that is slidably received in sealed manner in a cylindrical bore of the first portion 12.1 of the body, and a bottom end from which there extends an axially projecting distribution the rod 17.3 facing the outlet orifice 14 of the body 12.

Figure 2A:
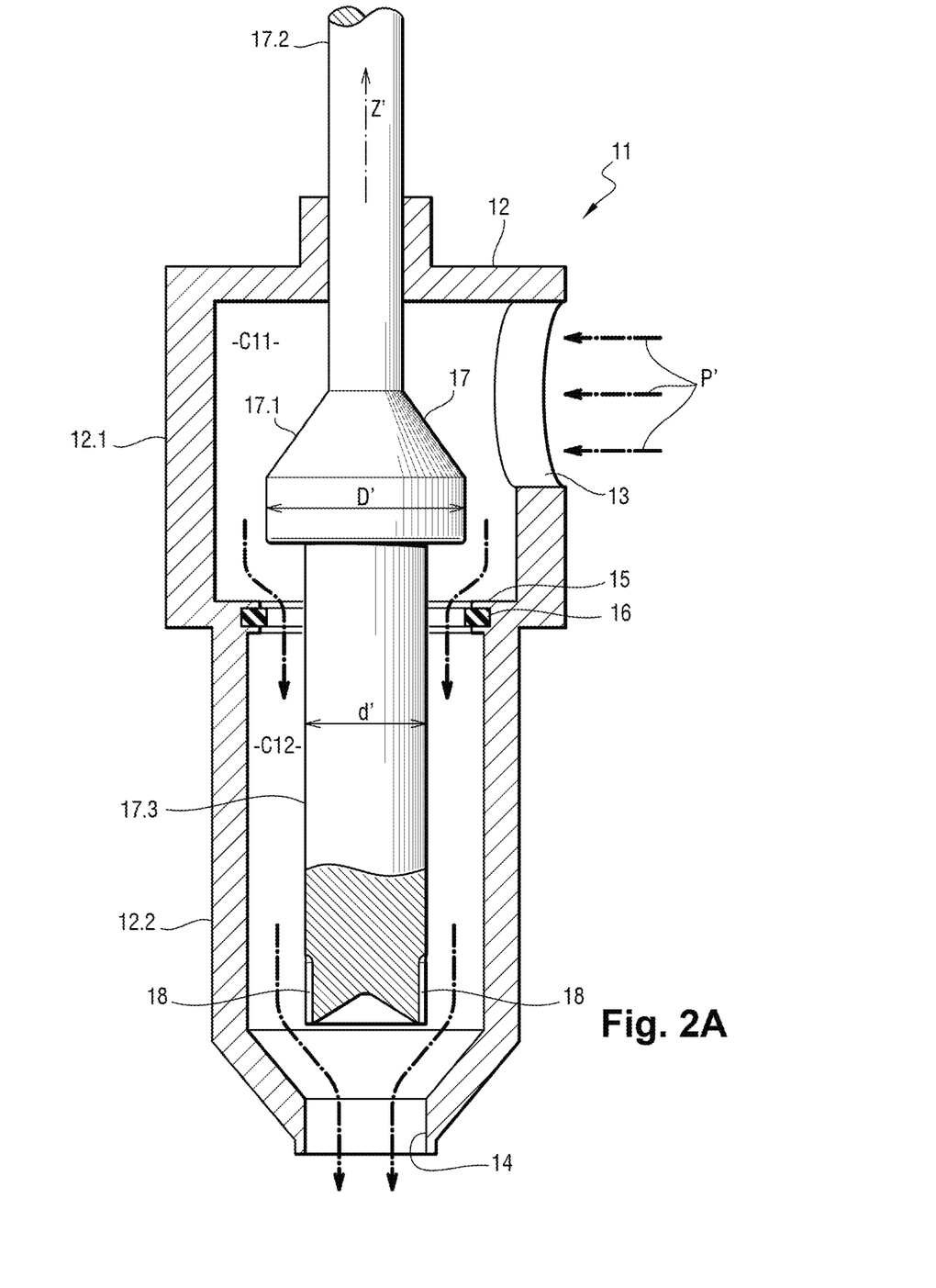
FIG. 2A is an axial section view of a filler spout in a second embodiment of the invention, the spout being in an open state with its valve member in its extreme opening position.
Figure 2B:
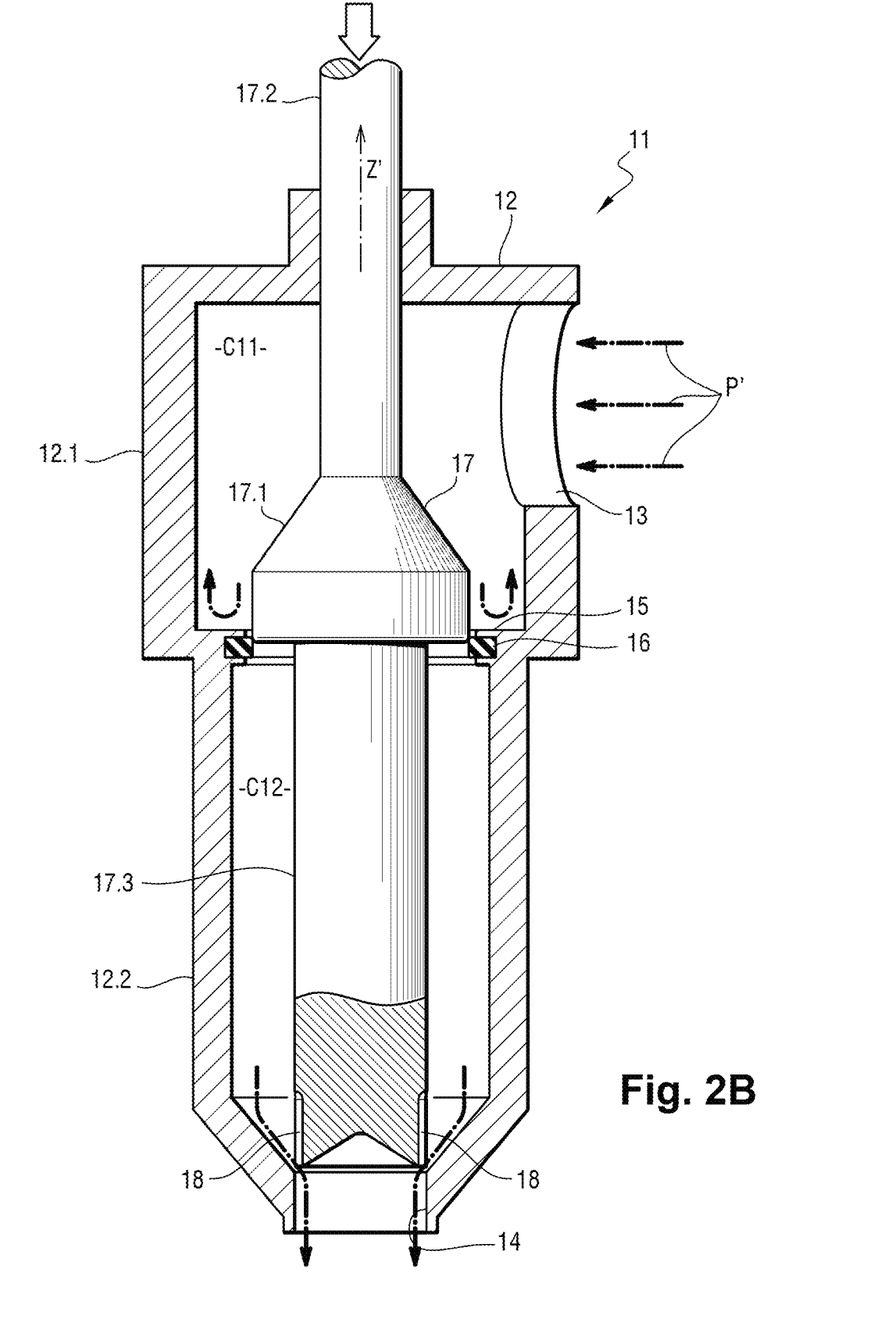
FIG. 2B is a view analogous to FIG. 2A, the spout being in a first closed state with its valve member in an intermediate closing position.
Figure 2C:
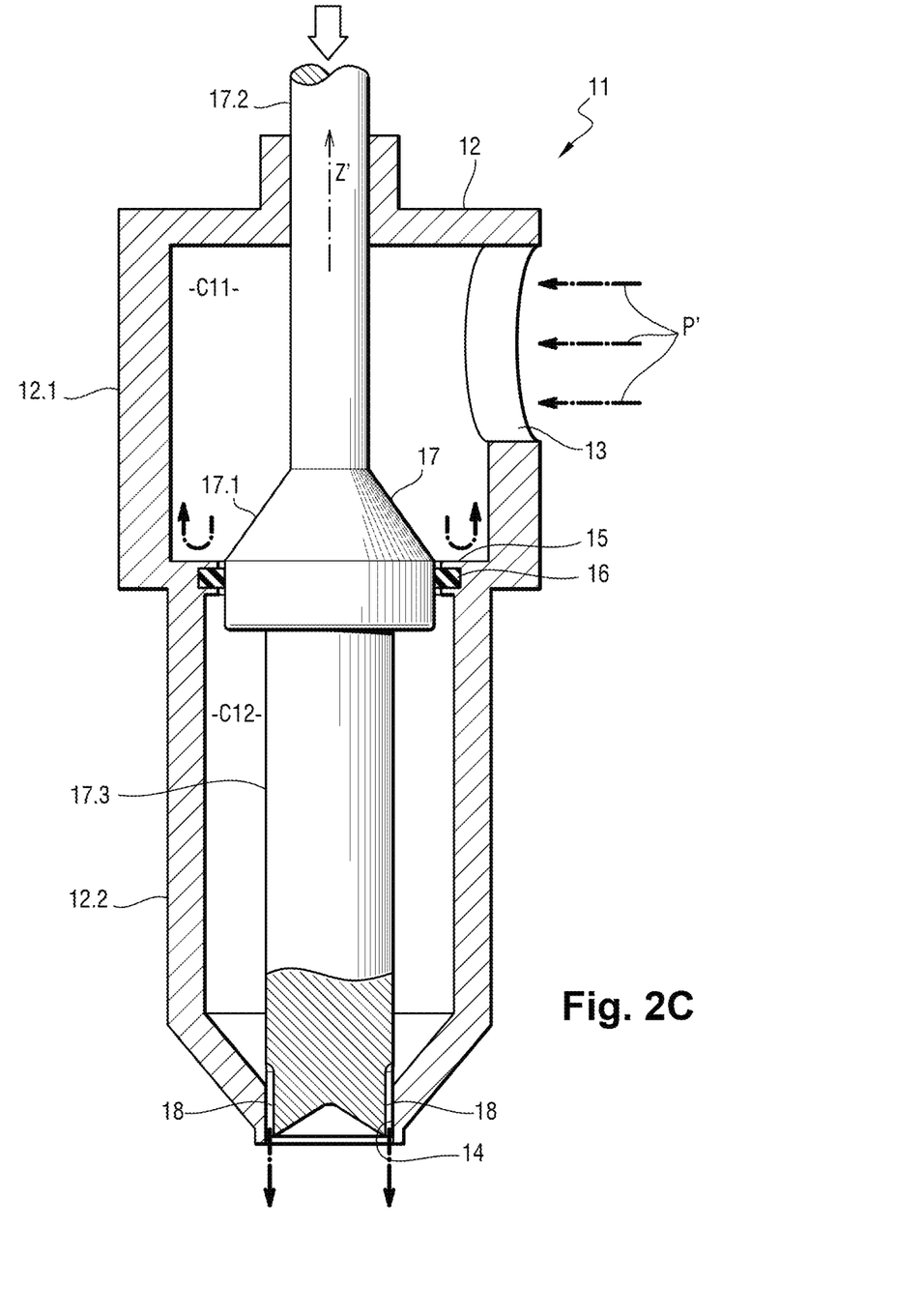
FIG. 2C is a view analogous to FIG. 2A, the spout being in a second closed state with its valve member in its extreme closing position.
Figure 2D:
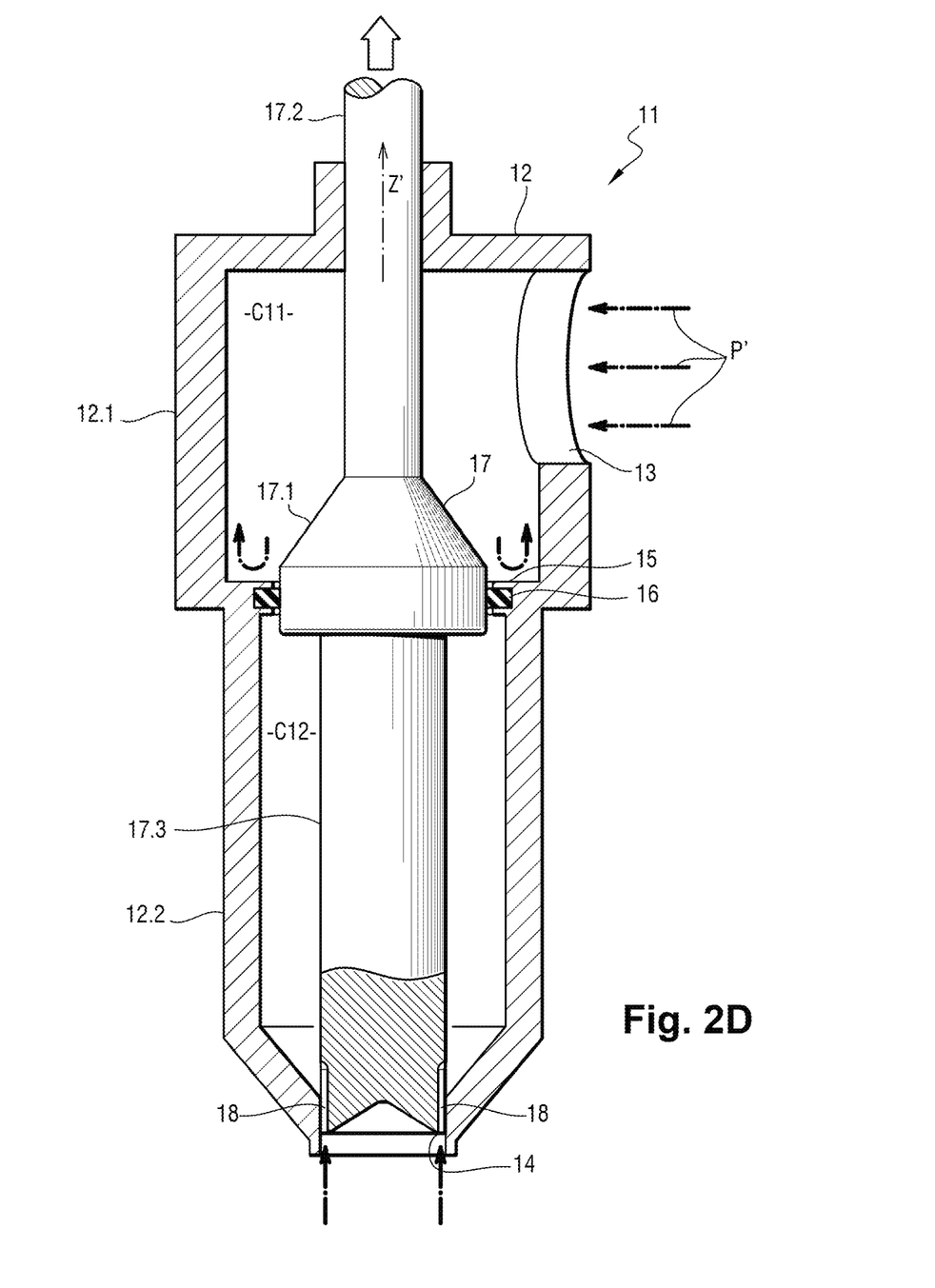
FIG. 2D is a view analogous to FIG. 2A, the spout being in a third closed state with its valve member in a position lying between its extreme closing state and its intermediate closing state.

As above, the control rod 17.2 is coupled to an actuator (not shown herein) for moving the valve member 17 between an extreme opening position shown in FIG. 2A and an extreme closing position shown in FIG. 2D. By way of example, the actuator may be a servomotor or a stepper motor controlled by a control unit.

Figure 2E:
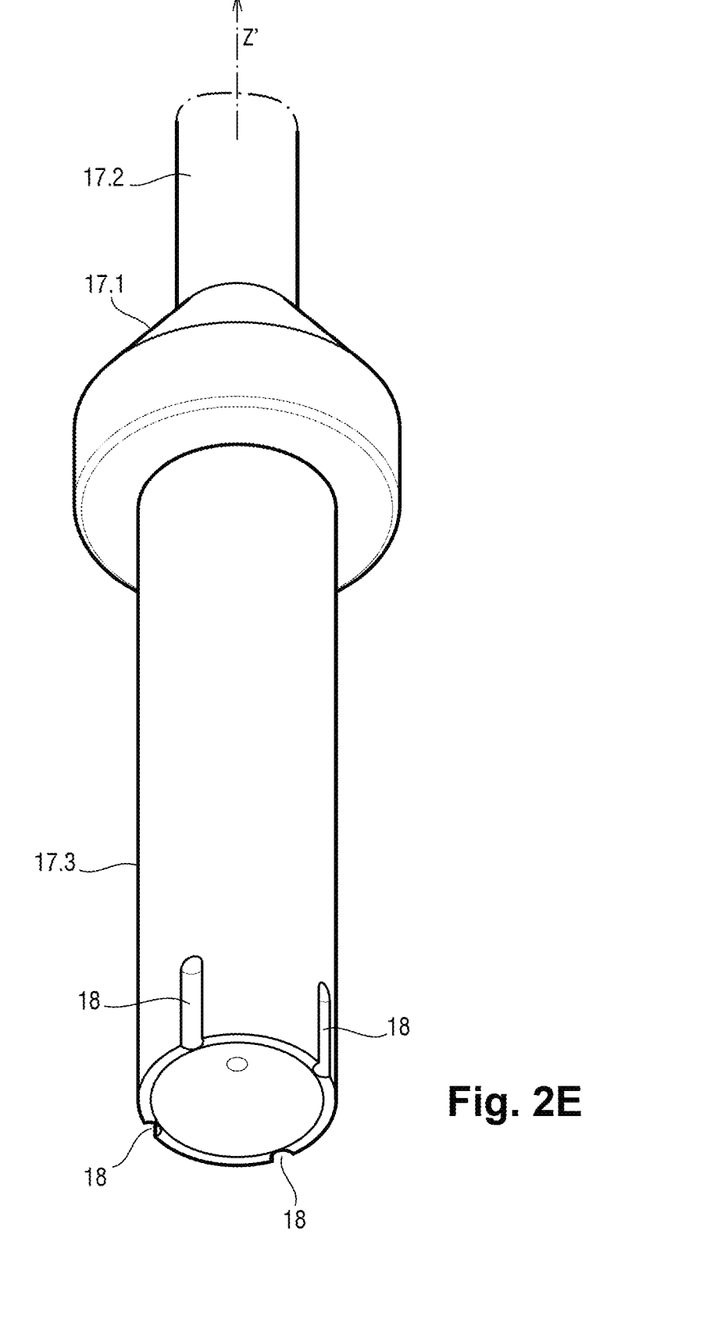
FIG. 2E is a perspective view of a free end of the valve member of the filler spout shown in FIG. 2A.

Finally, the distribution rod 17.3 of the filler spout 11 differs from the distribution rod 7.3 of the filler spout 1 in that it has a free end with a converging frustoconical outside surface pointing towards the inside of said distribution rod 17.3 and having its large base connected to a cylindrical outside surface of the diameter d'. The diameter d' is slightly smaller than the diameter of the outlet orifice 14 of the body so that the free end of the distribution rod 17.3 can be slidably received in said outlet orifice 14 and can obstruct it.

The free end of the distribution rod 17.3 also has open-ended axial grooves 18 forming channels that are distributed substantially regularly around the cylindrical outside surface of said distribution rod 17.3 (FIG. 2E). The axial grooves 18 are arranged in such a manner that they are always unobstructed in operation regardless of the position of the valve member 17.

When the valve member 17 is in its extreme opening position, the core 17.1 is arranged in the feed chamber C11. As above, the top portion of the core 17.1 has a surface that is frustoconical with its small base connected to the control rod 17.2, and the bottom portion of the core 7.1 has a cylindrical surface connected to the large base of said frustoconical outside surface. The diameter D' of the cylindrical outside surface of the core 17.1 is slightly greater than the inside diameter of the gasket 16 and is greater than the diameter d' of the distribution rod 17.3.

The operation of the filler spout 11 is substantially identical to the operation of the filler spout 1, and is described below in detail.

A container that is to be filled with liquid P' is arranged under the filler spout 11. The valve member 17 is then taken to its extreme opening position (FIG. 2A) in which the liquid P' entering the body 12 via its inlet orifice 13 passes through the feed chamber C11 and then the distribution chamber C12 in order to form a jet of liquid P' flowing substantially vertically from the outlet orifice 14 of the body 12. The rate at which the container is filled is a function of the section of the passage between the frustoconical portion of the distribution chamber C12 and the cylindrical outside surface of the distribution rod 17.3.

Once a predefined filling level of the container is reached, the valve member 17 is caused to slide substantially vertically, under drive from the actuator, towards the outlet orifice 14 of the body 12.

In a first stage, the cylindrical outside surface of the core 17.1 comes into contact with a top edge of the gasket 16 (FIG. 2B). The valve member 17 is then in an intermediate closing position in which the liquid P' entering through the inlet orifice 13 of the body 12 can no longer go from the feed chamber C11 to the distribution chamber C12, and the liquid P' present in the distribution chamber C12 is held captive by suction in said chamber. In this example, the distance along the axis Z' between the large base of the frustoconical outside surface of the distribution rod 17.1 and the small base of the frustoconical portion of the distribution chamber C12 is substantially equal to 1 mm.

As the valve member 17 continues to move down towards the outlet orifice 14, the large base of the frustoconical outside surface of the distribution of rod 17.3 comes into contact with the small base of the frustoconical portion of the distribution chamber C12, constraining the liquid P' to flow via the axial grooves 18 of the distribution rod 17.3. The distribution rod 17.3 then obstructs the outlet orifice 14 of the body 12.

In this example, the valve member 17 continues to move down until the cylindrical outside surface of the core 17.1 completely covers the gasket 16 and extends beyond the bottom edge of said gasket 16 by substantially 4 mm (FIG. 2C). As a result, the core 17.1 then exerts pressure on the liquid P' held captive in the distribution chamber C12 so that a portion of the liquid escapes via the axial grooves 18, thereby having the effect of limiting splashing at the outlet orifice 14 of the body 12. The valve member 17 is then in an extreme closing position in which the liquid P' entering through the inlet orifice 13 of the body 12 cannot go from the feed chamber C11 to the distribution chamber C12, and the liquid P' present in the distribution chamber C12 is held captive by suction in said chamber.

Thereafter, the valve member 17 remains in the extreme closing position for a predetermined length of time. The predetermined length of time corresponds to the time needed for the liquid P' situated on frustoconical outside surface of the distribution rod 17.3 to flow down a little and accumulate so as to form drops that are suspended from the large base of said frustoconical outside surface of the distribution rod 17.3.

At the end of the predetermined length of time, and still under drive from the actuator, the valve member 17 is raised sequentially along the axis Z', through a stroke that is substantially equal to 2 mm in this example (FIG. 2D). As above, the term "sequentially" is used herein to mean that the valve member 17 is not raised continuously, but rather as a plurality of substantially identical sequences, the sequences being separated by periods in which the valve member 17 is stationary. In this example, each sequence corresponds to being raised through a few tenths of a millimeter.

During each raising sequence, and as a result of its diameter D' being greater than the diameter d' of the distribution rod 17.3, the core 17.1 creates suction in the distribution chamber C12 that serves to suck up the drops and thus to limit pollution of the outside walls of the container.

The rising stroke of the valve member 17 depends in particular on the viscosity of the liquid P' and on the area exposed to the accumulation of said liquid forming the drops.

FIGS. 3A to 3D show a filler spout 21 in a third embodiment of the invention.

In similar manner to the filler spouts 1 and 11, the filler spout 21 comprises a generally tubular hollow body 22 extending along a vertical axis Z".

In similar manner to the filler spout 1, a first portion 22.1 of the body 22 defines a cylindrical feed chamber C21 that extends along the axis Z" and that is for connecting to a source for feeding a liquid P" via an inlet orifice 23 arranged in a side wall of the feed chamber C21.

A second portion 22.2 of the body 22 defines a distribution chamber C22 having bottom and top portions of cylindrical shape and an intermediate portion of converging frustoconical shape extending along the axis Z", said portions thus lying on the same axis as the feed chamber C21. The cylindrical bottom portion of the distribution chamber C22 opens out via an outlet orifice 24 of the body 22 through which the liquid P" can escape.

The feed chamber C21 and the distribution chamber C22 are connected together by a passage formed by a shoulder 25. This shoulder 25 has a groove arranged therein that receives a sealing gasket 26 as a moderately tight fit. In this example, the thickness of the gasket 26 is substantially equal to 2 mm.

Finally, the body 22 of the filler spout 21 differs from the bodies 2 and 12 of the filler spout 1 and 11 in that the distribution chamber C22 has an additional tubular portion having the effect of locating the outlet orifice 24 further away from the inlet orifice 23.

The body 22 contains a valve member, given overall reference 27, comprising a core 27.1 having a top end from which there extends an axially projecting control rod 27.2 that is slidably received in sealed manner in a cylindrical bore of the first portion 22.1 of the body, and a bottom end from which there extends an axially projecting distribution the rod 27.3 facing the outlet orifice 24 of the body 22.

Figure 3A:
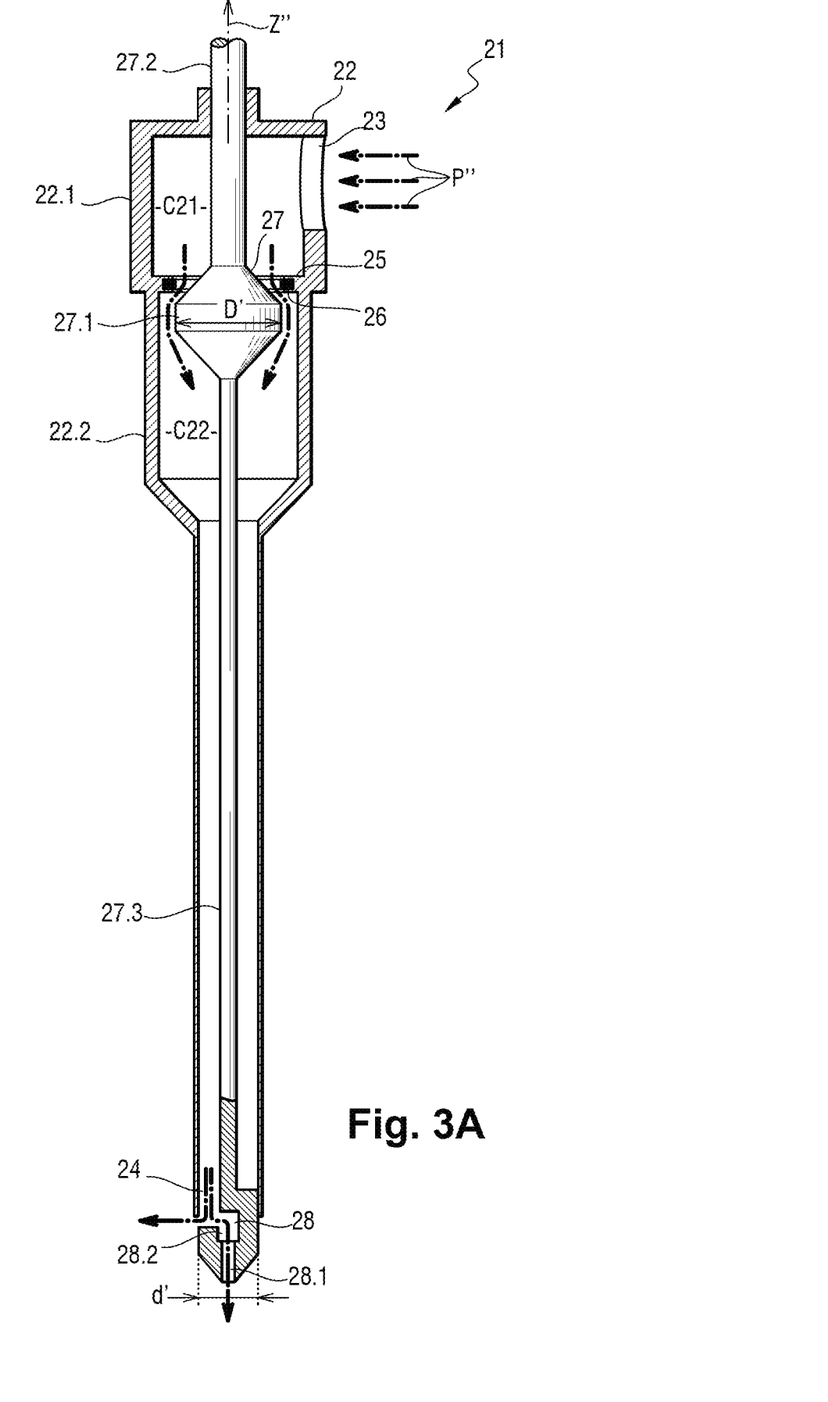
FIG. 3A is an axial section view of a filler spout in a third embodiment of the invention, the spout being in an open state with its valve member in its extreme opening position.
Figure 3B:
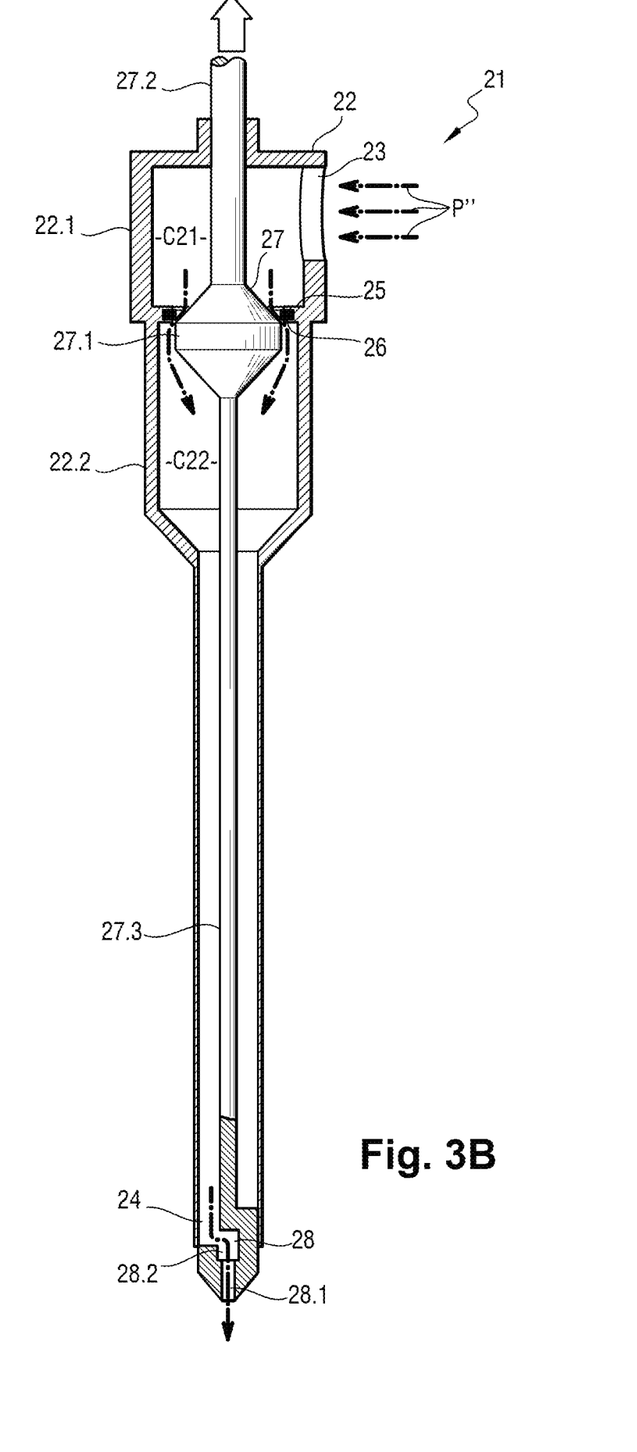
FIG. 3B is a view analogous to FIG. 3A, the spout being in a semi-open state with its valve member in an intermediate opening position.
Figure 3C:
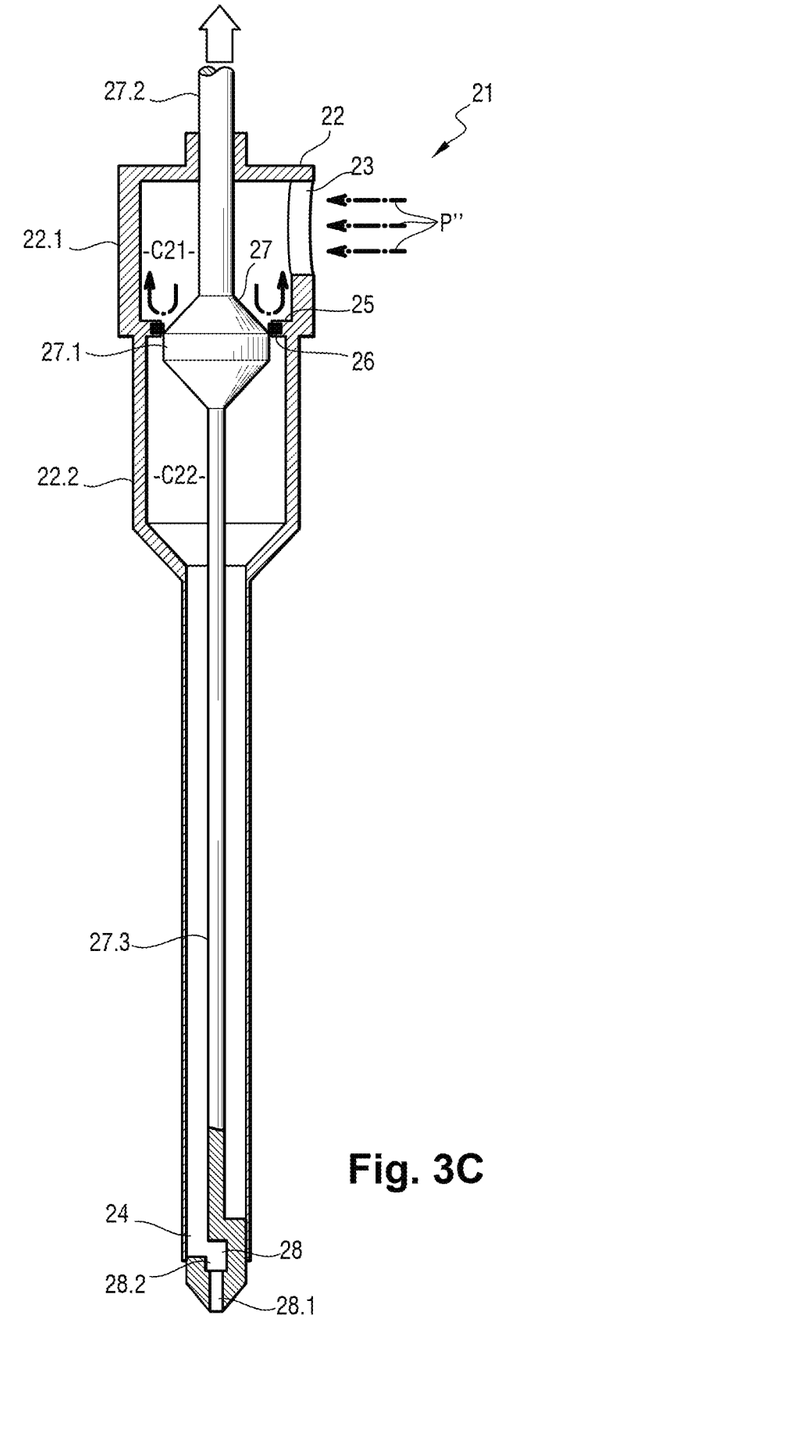
FIG. 3C is a view analogous to FIG. 3A, the spout being in a first closed state with its valve member in an intermediate closing position.
Figure 3D:
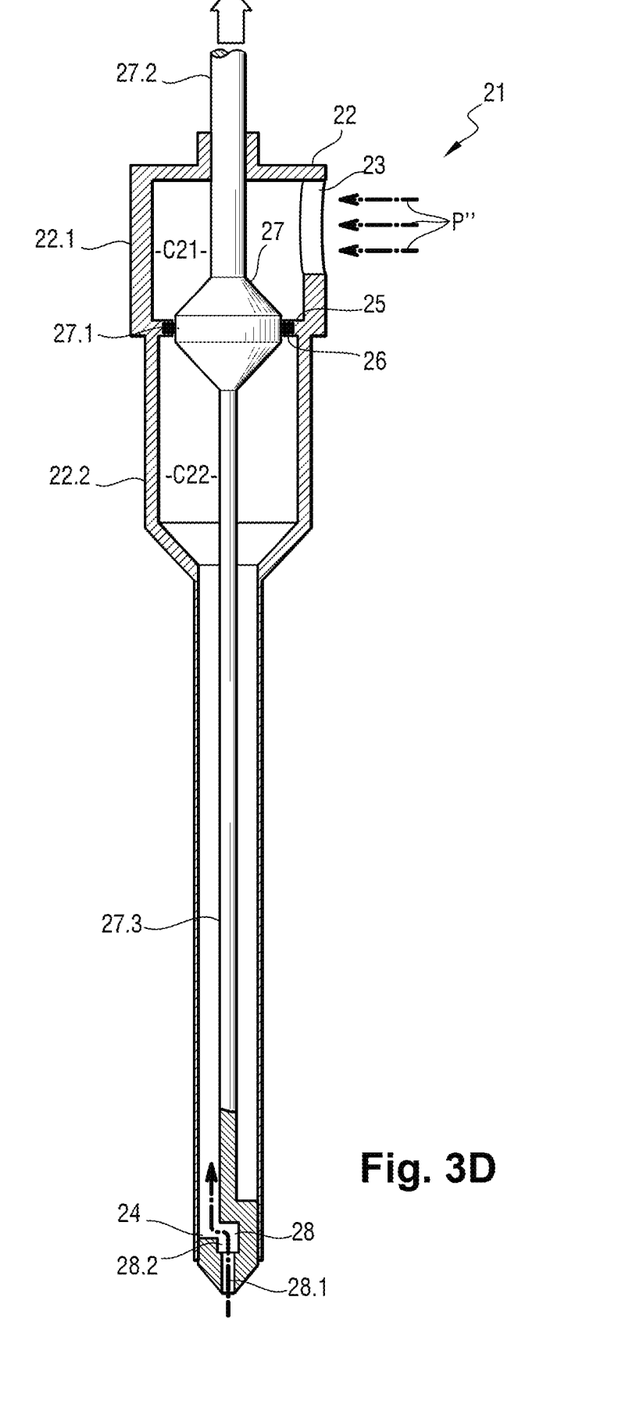
FIG. 3D is a view analogous to FIG. 3A, the spout being in a second closed state with its valve member in its extreme closing position.

As above, the control rod 27.2 is coupled to an actuator (not shown herein) for moving the valve member 27 between an extreme opening position shown in FIG. 3A and an extreme closing position shown in FIG. 3D. By way of example, the actuator may be a servomotor or a stepper motor controlled by a control unit.

At its free end, the distribution rod 27.3 has a converging frustoconical outside surface with its large base connected to a cylindrical outside surface of diameter d". The diameter d" is slightly smaller than the diameter of the outlet orifice 24 of the body 22 so that the free end of the distribution rod 27.3 can be slidably received in said outlet orifice 24 and can obstruct it.

The distribution rod 27.3 has a channel 28 comprising a substantially vertical first portion 28.1 opening out in the small base of the frustoconical outside surface of said rod end, and a second portion 28.2 opening out into the distribution chamber C22 and in a side wall of the cylindrical outside surface of the free end of the distribution rod 27.3. The first and second portions 28.1 and 28.2 of the channel 28 are arranged in such a manner that said channel 28 is always unobstructed in operation, regardless of the position of the valve member 27.

When the valve member 27 is in its extreme opening position, the core 27.1 is arranged in the distribution chamber C22. In top and bottom portions, the core 27.1 has a frustoconical outside surfaces with small bases connecting respectively to the control rod 27.2 and to the distribution rod 27.3, and in an intermediate portion, it has a cylindrical outside surface connecting together the large bases of said frustoconical outside surfaces. The diameter D" of the cylindrical outside surface of the core 27 is slightly greater than the inside diameter of the gasket 26 and is greater than the diameter d" of the distribution rod 27.3.

There follows a detailed description of the operation of the filler spout 21.

A bottom portion of the filler spout 21 is inserted in a container that is to be filled with liquid P". The valve member 27 is then brought to an extreme opening position (FIG. 3A) in which the liquid P" entering via the inlet orifice 23 of the body 22 passes through the feed chamber C21 followed by the distribution chamber C22 and forms a jet of liquid P" flowing from the first and second portions 28.1 and 28.2 of the channel 28. The rate at which the container is filled is a function of the section of the first portion 28.1 of the channel 28 and of the through section between the outlet orifice 24 and the second portion 28.2 of the channel 28.

Once a predefined filling level of the container is reached, the valve member 27 is caused to slide substantially vertically, under drive from the actuator, upwards and away from the outlet orifice 24 of the body 22.

In a first stage, the through section between the outlet orifice 24 and the second portion 28.2 of the channel 28 becomes zero (FIG. 3B) thus preventing the liquid P'" from flowing between said outlet orifice 24 and said second portion 28.2 of the channel 28. The liquid P'" then flows solely via the first portion 28.1 of the channel 28. The valve member 27 is in a position referred to as its "intermediate" opening position in which the liquid P'" can flow, but to a smaller extent, from the feed chamber C21 to the distribution chamber C22, since the through section between the cylindrical outside surface of the core 27.1 and the gasket 26 is now greatly reduced. In this example, the distance along the axis Z" between the core 27.1 and the gasket 26 is substantially equal to 1 mm. The flow of liquid P'" into the container is thus slowed down but is not stopped suddenly.

As the valve member 27 continues to rise, the cylindrical outside surface of the 27.1 comes into contact with a bottom edge of the gasket 26 (FIG. 3C). The valve member 27 is then in an intermediate closing position in which the liquid P'" entering through the inlet orifice 23 of the body 22 can no longer go from the feed chamber C21 to the distribution chamber C22, and the liquid P'" present in the distribution chamber C22 is held captive by suction in said chamber.

Thereafter, the valve member 27 remains in the intermediate closing position for a predetermined length of time. The predetermined length of time corresponds to the time needed for the liquid P'" situated on frustoconical outside surfaces of the distribution rod 27.3 to flow down a little and accumulate so as to form a drop that is suspended from the small base of the frustoconical outside surface of the distribution rod 27.3. At the end of the predetermined length of time, and still under drive from the actuator, the valve member 27 is raised sequentially along the axis Z", through a stroke that is substantially equal to 4 mm in this example. The term "sequentially" is used herein to mean that the valve member 27 is not raised continuously, but rather as a plurality of substantially identical sequences, the sequences being separated by periods in which the valve member 27 is stationary. In this example, each sequence corresponds to being raised through a few tenths of a millimeter.

During each raising sequence, and as a result of its diameter D" being greater than the diameter d" of the distribution rod 27.3, the core 27.1 creates suction in the distribution chamber C22 that serves to suck up the drop and thus to limit pollution of the walls of the container.

The sequential rising stroke of the valve member 27 depends in particular on the viscosity of the liquid P'" and on the area exposed to the accumulation of said liquid forming the drop.

At the end of its stroke, the cylindrical outside surface of the core 27.1 completely covers the gasket 26, and in this example projects beyond the top edge of said gasket 26 by substantially 2 mm (FIG. 3D). The valve member 27 is then in an extreme closing position in which the liquid P'" entering through the inlet orifice 23 of the body 22 cannot go from the feed chamber C21 to the distribution chamber C22, and the liquid P'" present in the distribution chamber C22 is held captive therein by suction.

Naturally, the invention is not limited to the embodiments described and covers any variant coming within the ambit of the invention as defined by the claims.

The core 7.1, 17.1, 27.1 of the valve member 7, 17, 27 may be of a shape that is different from the shapes described above, and in particular the frustoconical portion(s) of said core could be concave or indeed convex in shape, for example.

In the same manner as the shutter-forming end of the distribution rod 17.3 replaces the end of the distribution rod 7.3, the end of the distribution rod 27.3 may be replaced by the end of the distribution rod 17.3 without modifying the corresponding distribution process.

The invention claimed is:

1. A filler spout comprising a tubular body having mounted therein both a valve member extending facing an inlet orifice of a distribution chamber and also a shutter arranged downstream from the valve member and rigidly connected thereto in such a manner as to extend facing an outlet orifice of the distribution chamber, and an actuator coupled to the valve member in order to move it between an extreme opening position and an extreme closing position, the valve member possessing an intermediate closing position in order to form a suction piston when the valve member is moved from the extreme closing position to the intermediate closing position or from the intermediate closing position to the extreme closing position, the shutter including at least one channel opening into the distribution chamber and facing the outlet orifice of said chamber so that the channel is always unobstructed regardless of the position of the valve member.

2. The filler spout according to claim 1, wherein the valve member comprises a core having a top end from which there extends an axially projecting control rod that is slidably received in sealed manner in a cylindrical bore of the body, and a bottom end from which there extends an axially projecting distribution rod having an end forming the shutter facing the outlet orifice of the body.

3. The filler spout according to claim 2, wherein the core has a first frustoconical outside surface with its small base connected to the control rod and a cylindrical outside surface connected to the large base of said frustoconical outside surface.

4. The filler spout according to claim 3, wherein the core has a second frustoconical outside surface with its small base connected to the distribution rod.

5. The filler spout according to claim 1, wherein the actuator is a servomotor or a stepper motor.

6. A distribution method using a filler spout according claim 1, the method comprising the following steps:
   bringing a container under the filler spout;
   controlling the actuator so that the valve member is in its extreme opening position;
   controlling the actuator so that the valve member moves from its extreme opening position to its extreme closing position;
   controlling the actuator so that the valve member moves from its extreme closing position to its intermediate closing position.

7. A distribution method using a filler spout according to claim 1, the method comprising the following steps:
   bringing a portion of the filler spout into a low position in the vicinity of the bottom of a container and between the low position and a high position outside the container;
   controlling the actuator so that the valve member is in its extreme opening position;
   controlling the actuator so that the valve member moves from its extreme opening position to its intermediate closing position;
   controlling the actuator so that the valve member moves from its intermediate closing position to its extreme closing position.

* * * * *